United States Patent
Knezevic et al.

(10) Patent No.: US 11,500,786 B2
(45) Date of Patent: Nov. 15, 2022

(54) SYSTEM AND METHOD FOR PROTECTING MEMORY ENCRYPTION AGAINST TEMPLATE ATTACKS

(71) Applicant: NXP B.V., Eindhoven (NL)

(72) Inventors: Miroslav Knezevic, Austin, TX (US); Vitaly Ocheretny, Hamburg (DE)

(73) Assignee: NXP B.V., Eindhoven (NL)

( * ) Notice: Subject to any disclaimer, the term of this patent is extended or adjusted under 35 U.S.C. 154(b) by 118 days.

(21) Appl. No.: 16/701,897

(22) Filed: Dec. 3, 2019

(65) Prior Publication Data

US 2021/0165746 A1 Jun. 3, 2021

(51) Int. Cl.
| | |
|---|---|
| *G06F 12/14* | (2006.01) |
| *G06F 21/60* | (2013.01) |
| *G06F 21/62* | (2013.01) |
| *G06F 21/78* | (2013.01) |

(52) U.S. Cl.
CPC ...... *G06F 12/1408* (2013.01); *G06F 12/1425* (2013.01); *G06F 21/602* (2013.01); *G06F 21/6227* (2013.01); *G06F 21/78* (2013.01)

(58) Field of Classification Search
CPC ............ G06F 12/1408; G06F 12/1425; G06F 21/602; G06F 21/6227; G06F 21/78
See application file for complete search history.

(56) References Cited

U.S. PATENT DOCUMENTS

| | | | | |
|---|---|---|---|---|
| 2001/0022823 | A1* | 9/2001 | Renaud | H04J 3/0638 375/354 |
| 2010/0031057 | A1 | 2/2010 | Beaver et al. | |
| 2012/0079285 | A1* | 3/2012 | Gueron | G06F 12/1408 713/190 |
| 2016/0182223 | A1* | 6/2016 | Kishinevsky | G06F 12/1408 380/28 |

OTHER PUBLICATIONS

S.Ghose et al., What Your DRAM Power Models Are Not Telling You: Lessons from a Detailed Experimental Study. Proc. ACM Meas. Anal. Comput. Syst. 2, 3, Article 38 (Dec. 2018), 41 pages.*
Dunkelman, Orr et al.; "Minimalism in Cryptography: The Even-Mansour Scheme Revisited;" Eurocrypt 2012; Apr. 15-19, 2012; Cambridge, United Kingdom; ; DOI: 10.1007/978-3-642-29011-4_21.
Unterluggauer, T, et al. "Exploiting the Physical Disparity: Side-Channel Attacks on Memory Encryption", Standaert FX., Oswald E. (eds) Constructive Side-Channel Analysis and Secure Design. COSADE 2016. Lecture Notes in Computer Science, vol. 9689. Springer, Cham, pp. 1-16. (2016).

* cited by examiner

*Primary Examiner* — Matthew T Henning

(57) ABSTRACT

A method for protecting data includes encrypting information to generate a first tweak, combining a data block with the first tweak, encrypting the tweaked data block to form encrypted data, combining the encrypted data with the first tweak, and providing the combined encrypted data for storage in a memory address. Storing the combined encrypted data at the memory address generates a first stimulus different from a second stimulus generated by storing same encrypted data combined with a second tweak at the memory address. The first stimulus is generated based on the first tweak and the second stimulus is generated based on the second tweak.

20 Claims, 7 Drawing Sheets

SYSTEM AND METHOD FOR PROTECTING MEMORY ENCRYPTION AGAINST TEMPLATE ATTACKS

Example embodiments disclosed herein relate generally to a system and method for protecting against template attacks.

BACKGROUND

Side-channel attacks attempt to gain unauthorized access to information that is protected by encryption. Unlike other hacking methods, side-channel attacks attempt to obtain information gained from the implementation of a system, rather than weaknesses in the implemented algorithm. The information may include timing data, power consumption patterns, electromagnetic leaks, or other parameters that occur when a decryption key is used by an authorized entity. The information may be processed to derive a reproducible stimulus (e.g., a signal pattern, signature, waveform, etc.) that mimics a decryption key and which allows access to the protected information by a hacker.

One type of side-channel attack is known as a template attack. A template attack involves creating a profile of a sensitive device (e.g., smartphone, computer, memory, etc.) storing protected data. The profile is then applied to determine the secret key of a victim. Once known, the malicious attacker uses the key to access the protected information.

Some template attacks demonstrated by security experts in the past have targeted memory encryption using XOR-Encrypt-XOR (XEX) mode of operation. If consecutive data blocks to be encrypted and stored at the same address slightly differ from each other (e.g., a single byte difference), then an attacker may be able to successfully build a template, during the profiling phase of attack, by measuring power consumption or/and electromagnetic radiation of that operation. During the exploitation phase, the attacker may measure the response from the secret data that is supposed to be encrypted and recovers it using previously built templates.

The reason this attack succeeds is because a single round of a block cipher has a very limited diffusion and hence the power signature of individual data bytes might be observable during the first round. In the first round, data bytes are typically XOR-ed with a secret (but fixed) key and the result of that operation is fed into the S-box layer. Only after the S-box layer has been processed, the first diffusion operation is applied and after that it becomes difficult to observe any individual byte leakage. However, it is the XOR logic itself as well as the corresponding S-boxes that cause the power consumption to be correlated to the data input.

Several attempts have been made to counter template attacks. One attempt involves changing the encryption key before the attacker is able to collect a number of power traces sufficient to form the template. However, this method has proven inadequate because key management is a sensitive operation on its own and typically a single key is used to encrypt a large portion of memory. Changing the key would therefore require re-encrypting the entire memory with a new key, which is practically inefficient and would have a substantial adverse impact on overall system performance.

SUMMARY

In accordance with one or more embodiments, a method for protecting data includes encrypting information to generate a first tweak; combining a data block with the first tweak; encrypting the tweaked data block to form encrypted data; combining the encrypted data with the first tweak; and providing the combined encrypted data for storage in a memory address, where storing the combined encrypted data at the memory address generates a first stimulus different from a second stimulus generated by storing same encrypted data combined with a second tweak at the memory address, the first stimulus generated based on the first tweak and the second stimulus generated based on the second tweak. In one case, the information may include the memory address and a first tweak control value.

The method may include combining the memory address and the first tweak control value to generate a combined value, where encrypting the information may include encrypting the combined value based on at least one key to generate the first tweak. Combining the memory address and the first tweak control value may include concatenating the memory address and the first tweak control value. Combining the data block with the first tweak may be performed based on first logic and combining the encrypted data with the first tweak may be performed based on second logic. The first logic may be same as the second logic. Each of the first logic and the second logic may perform an XOR operation.

The first tweak may be based on a first tweak control value, the second tweak may be based on a second tweak control value, and the first and second tweak control values may include at least one of different counter values, random values, or hashed values. Each of the first stimulus and the second stimulus may include at least one of timing data, power consumption pattern, electromagnetic leak, signal pattern, signature, or waveform.

In accordance with one or more other embodiments, a method for protecting data includes performing a first process including encryption of a first data block; providing the encrypted first data block for storage at a memory address; performing a second process including encryption of a second data block; and providing the encrypted second data block for storage at the memory address, where the first process is based on a first tweak and the second process is based on a second tweak different from the first tweak and wherein the encrypted first data block and the encrypted second data block are provided for storage at the memory address at different times, the first data block and the second data block including same data.

Performing the first process may include (a) combining the first data block with the first tweak to form a first combined data block; (b) encrypting the first combined block to generate encrypted data; and (c) combining the encrypted data in (b) with the first tweak to generate the first encrypted data block, for storage at the memory address. Performing second first process may include (d) combining the second data block with the second tweak to form a second combined data block; (e) encrypting the second combined data block to generate encrypted data; and (f) combining the encrypted data in (e) with the second tweak to generate the second encrypted data block for storage at the memory address. Combining in (a), (c), (d), and (f) may be performed based on same logic.

The first tweak may be based on the memory address and a first tweak control value and the second tweak may be based on the memory address and a second tweak control value different from the first tweak control value. The method may include generating the first tweak by combining the memory address and the first tweak control value to form a first combined value and encrypting the first combined value; and generating the second tweak by combining the memory address and second tweak control value to form a second combined value and encrypting the second combined value.

In accordance with one or more other embodiments, a data storage manager includes a first cipher engine configured to encrypt information to generate a first tweak; a first combiner configured to combine a data block with the first tweak; a second cipher engine configured to encrypt the tweaked data block to form encrypted data; and a second combiner configured to combine the encrypted data with the first tweak to form combined encrypted data for storage in a memory address, where storing the combined encrypted data at the memory address is configured to generate a first stimulus different from a second stimulus generated by storing same encrypted data combined with a second tweak at the memory address, the first stimulus to be generated based on the first tweak and the second stimulus to be generated based on the second tweak. The information may include the memory address and a first tweak control value.

The data storage manager may include a third combiner configured to combine the memory address and the first tweak control value to generate a combined value, wherein the first cipher engine may encrypt the combined value based on at least one key to generate the first tweak. The first combiner may include first logic to combine the data block with the first tweak; and the second combiner may include second logic to combine the encrypted data with the first tweak. The first tweak may be based on a first tweak control value, the second tweak may be based on a second tweak control value, and the first and second tweak control values may include at least one of different counter values, random values, or hashed values.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the figures, in which:

DETAILED DESCRIPTION

Figure 1:
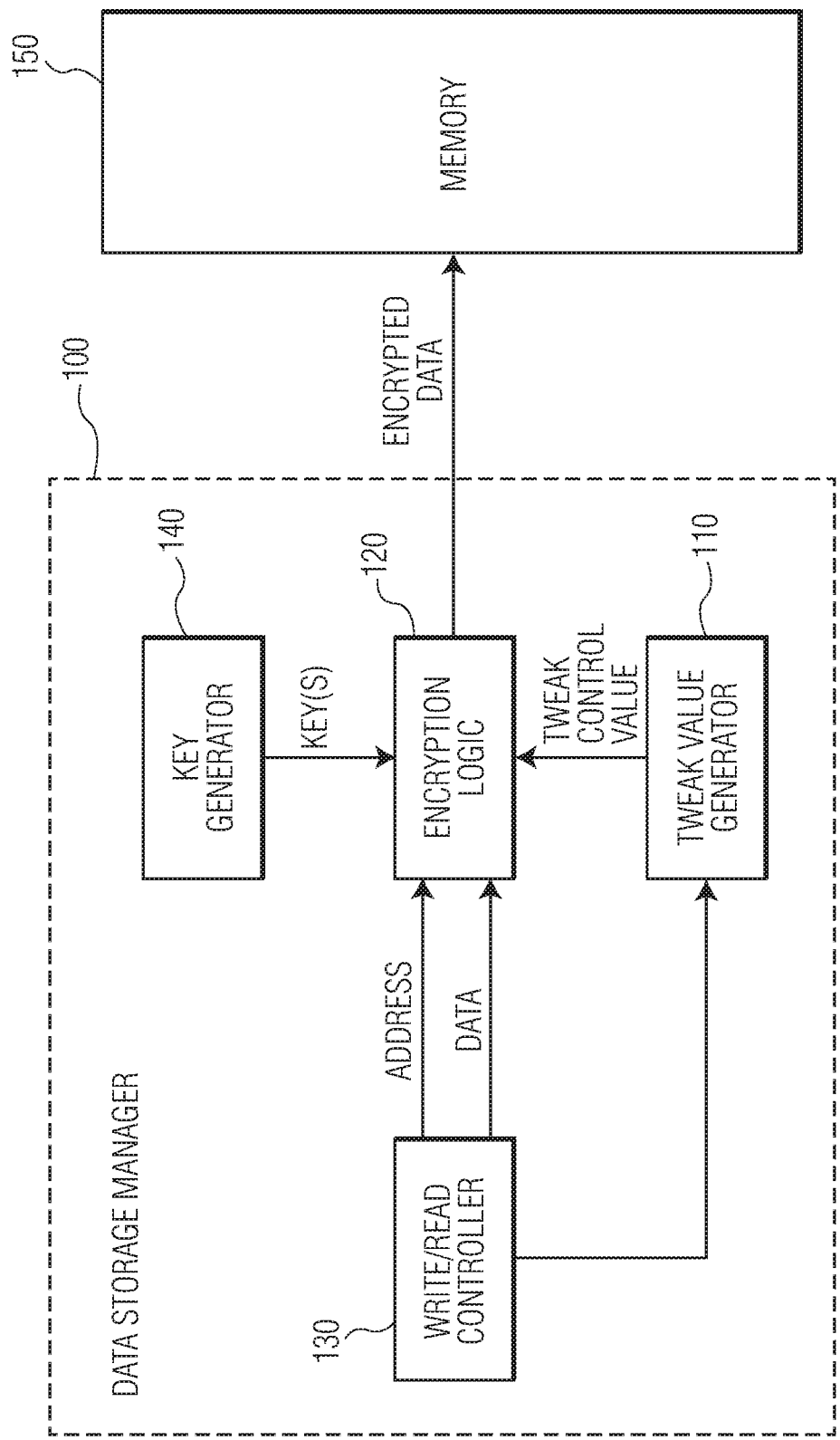
FIG. 1 illustrates an embodiment of a system for protecting encrypted data.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

FIG. 1 illustrates an embodiment of a system for protecting encrypted data which is stored in a memory from unauthorized access, corruption, or other forms of malicious attack. The memory may be any type of memory including a random-access memory, a read-only memory, an internal or external hard-drive (disk or solid state), flash memory, compact disk, digital versatile disk, or another type of non-transitory computer-readable medium. Such a memory may be included, for example, in a computer, smartphone, memory module, server, cloud-computing processor, removable or another device.

Referring to FIG. 1, the system includes a data storage manager 100 comprising a tweak value generator 110, encryption logic 120, a write/read controller 130, and a key generator 140 coupled to memory 150. The tweak value generator 110 generates tweak control values that are to be input into the encryption logic for generating encrypted data to be stored in the memory. In one embodiment, at least one different tweak control value may be used for encrypting the data to be stored at each memory location. The use of different tweak control values for the stored data enhances protection against template and other forms of malicious attacks. In one embodiment, a tweak control value may not be applied to each memory location or the entire memory. Rather, in one embodiment, a tweak control value may be applied selectively for specific addresses, which may be contiguous (e.g., one memory region) or non-continuous (e.g., multiple memory regions).

In another embodiment, multiple tweak control values may be used for generating the data to be encrypted at each memory address. For example, the multiple tweak control values may be used for corresponding specific memory addresses. This may be illustrated as follows. If a first tweak control value (TCV1) is used for data at address A and a second tweak control value (TCV2) is used for data at address B, then TCV1 may not be used for data at address B and TCV2 may not be used for data A. Also, in one embodiment, TCVs may be re-assigned (e.g. TCV1 to address B and TCV2 to address A) but data previously stored at the addresses will be lost. In these or other embodiments, the TCVs may be independent of each other and may not be used for the same address. In one embodiment, a combination of different TCVs may be used for the same address, but in this case the TCVs may not independent and may be considered as a new TCV.

In one embodiment, the tweak control values may include counter values that are incremented for the data to be stored at respective locations (e.g., addresses) in the memory.

Incrementing the counter values ensures that the data input into the memory are tweaked by different control values. In another embodiment, the tweak control values may include predetermined values stored in a lookup table. In this case, the table may store different tweak control values for the data to be stored at respective memory locations. In other embodiments, the tweak control values may be generated in a different manner. For example, the tweak control values may be generated as different hashed values or different random values. Copies of the tweak control values, along with the key(s) used by the encryption logic, may be stored (e.g., inside or outside of memory 150) for use in decrypting and recovering the data when accessed during a read operation.

The encryption logic 120 may perform two stages of encryption in this embodiment. The first stage of encryption includes receiving an address from the read/write controller 130 and the tweak control value from the tweak value generator 110 and then generating a tweak based on the address and tweak control value. The address corresponds to the location in the memory where corresponding data is to be written. In one embodiment, the address and tweak control value may be combined and then subjected to an encryption algorithm for generating the tweak. The address and tweak control value may be combined, for example, based on a concatenation operation, a logical combination, or another method of combining these features.

The tweak may be generated by a first block cipher engine in the encryption logic 120, which encrypts the combined address and tweak control value using a first encryption key output from the key generator 140. The first encryption key may be a secret key used in a symmetric block cipher. Examples of symmetric block cipher keys include AES, DES, and Prince, as well as others, as discussed in greater detail below. The second stage of encryption includes encrypting the data to be stored at each address of the memory 150 based on the tweak generated by the first cipher engine. (In FIG. 1, memory 150 may refer to the whole memory or a part of a larger memory which is only encrypted. Or, memory 150 may contain parts which are encrypted and which are not encrypted.) Encryption of the data may be performed by a second cipher engine using the tweak and a second encryption key generated by the key generator 140. The encryption algorithm used by the second cipher engine may be, for example, a symmetric algorithm such as triple DES, an advanced encryption standard (AES) algorithm, RC4, or another algorithm. The algorithm used by the second cipher engine may be the same or different from the encryption algorithm used by the first cipher engine to generate the tweak. Also, in one embodiment, the first cipher engine and the second cipher engine may be the same cipher engine. Additional examples of the encryption algorithms used to generate the tweak and perform the data encryption are discussed in greater detail below.

Once generated, the encrypted data is sent to the memory for storage at the addresses used to generate respective ones of the tweaks. In one embodiment, the data may include plaintext and the encrypted data may include ciphertext. Through this multi-stage encryption, the data storage manager 100 ensures that the encrypted data stored at each memory address generates a different stimulus when input into the memory 150, irrespective or independent of whether the data is the same or different data. This different stimulus provides enhanced protection against side-channel attacks of the memory (including template attacks), which are performed based on an attempt to mimic timing data, power consumption patterns, signal patterns, signatures, waveforms, electromagnetic leaks, or another stimuli that occur when data is stored in the memory.

Figure 2:
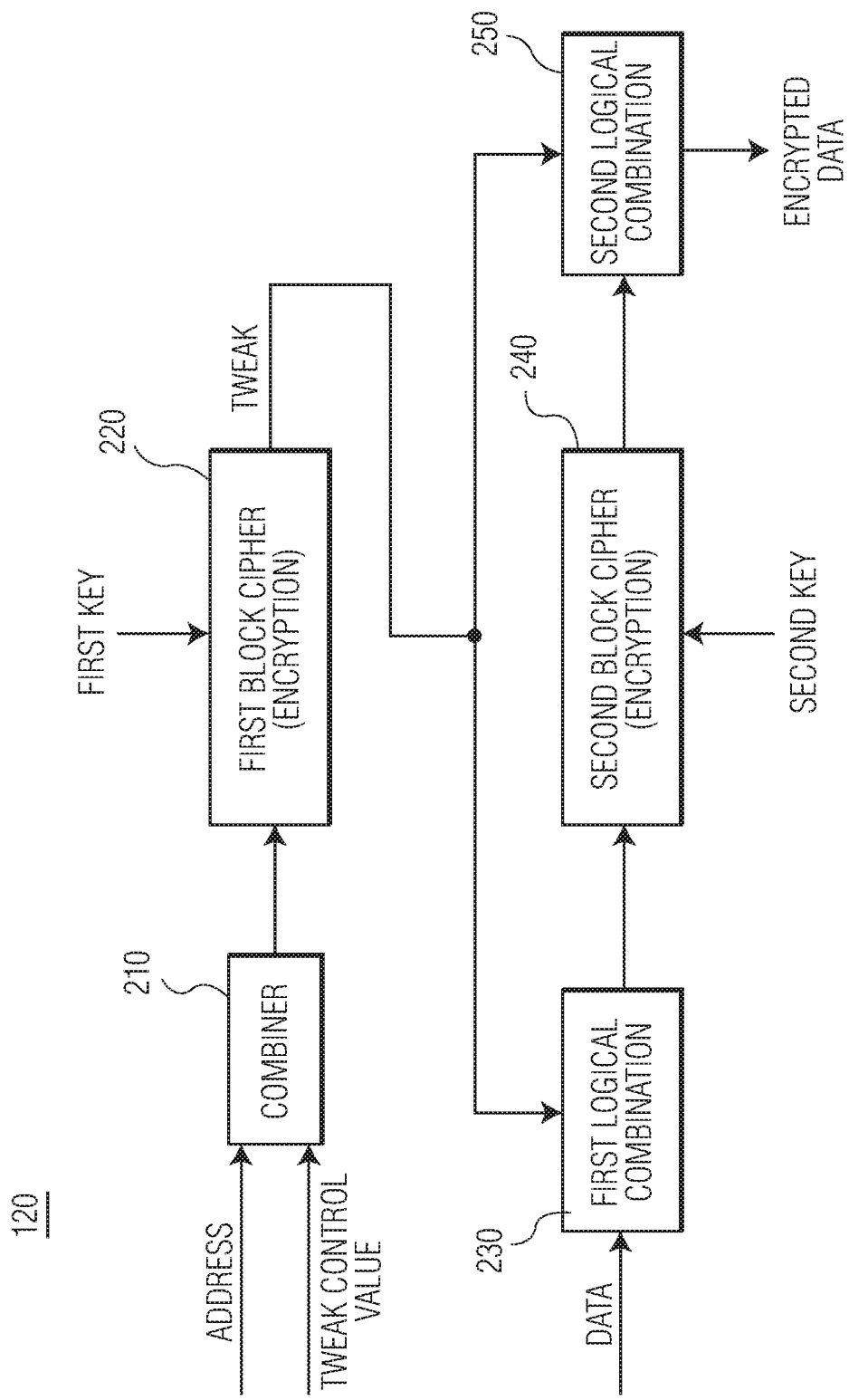
FIG. 2 illustrates an embodiment of encryption logic.

FIG. 2 illustrates an embodiment of encryption logic 120 including a combiner 210, a first block cipher engine 220, a first logical combination 230, a second block cipher engine 240, and a second logical combination 250. The combiner 210 combines a memory address and a tweak control value for each item of data to be stored at that address. The data to be stored at each address may be a predetermined number of bits in length depending on memory size, storage protocols, and/or other parameters specific to the memory. The combiner 210 may combine the address and tweak control value in various ways. For example, in one embodiment, the address and tweak control value may be concatenated. In another embodiment, the address and tweak control value may be logically combined using, for example, one or more logical gates. In other embodiments, the address and tweak control value may be combined by hash or non-linear transformation, e.g., S-box (substitution function).

When the address and tweak control value have different bit lengths, fill value(s) may be appended to the bits of the shorter of the address or tweak control value to make them equal lengths. In one example, the combiner 210 may have an n-bit input (which is the sum of address length and TVC length) and m-bit output (where m is exactly the block size of first block cipher 220) and composed of logical gates which implement a combining function. The address and tweak control value may be combined in a different way in other embodiments. The combined value generated by the combiner 210 is output to the first block cipher engine.

The first block cipher engine 220 encrypts the combined value output from the combiner based on a first key. The encryption may be any of the types of encryption previously described, and the first key may also be any of those described above. Once encrypted, the first block cipher engine 220 outputs a tweak that is to be used in encrypting the data.

The first logical combination 230 uses one or more logic gates to combine the data to be stored and the tweak output from the first block cipher engine. In one embodiment, the tweak may have the same size as either block cipher. For example, the tweak and the data to be stored may have the same bit length, in which case a fill operation based on predetermined values need not be performed. The resulting combined value is then output to the second block cipher engine. In other embodiments, the tweak and the block cipher may have different sizes.

The second block cipher engine 240 encrypts the combined value output from the first logical combination based on a second key. The second key may be any of the types of keys previously described. In one embodiment, the first and second keys may be different from one another. In another embodiment, these keys may be the same. Also, the encryption algorithm implemented by the second block cipher engine may be the same or different from the algorithm used by the first block cipher engine.

The second logical combination 250 combines the encrypted output of the second block cipher engine with the same tweak that was combined with the data by the first logical combination 230. The logical combination operation performed by the second logical combination may be the same or different from the operation performed by the first logical combination. The resulting output corresponds to encrypted data that generates a stimulus that cannot be used as a basis for determining the data that is encrypted and stored at the memory address where the encrypted data is stored. This stimulus changes for the same memory address, because the tweak control value changes even when the same data is stored at the same memory address. This enhances the resiliency of the stored and encrypted data from being compromised by a side-channel (e.g., template) attack. In one embodiment, the encryption key may be security critical and the tweak control value may be managed in a similar way as the address, e.g., not security critical.

Figure 3:
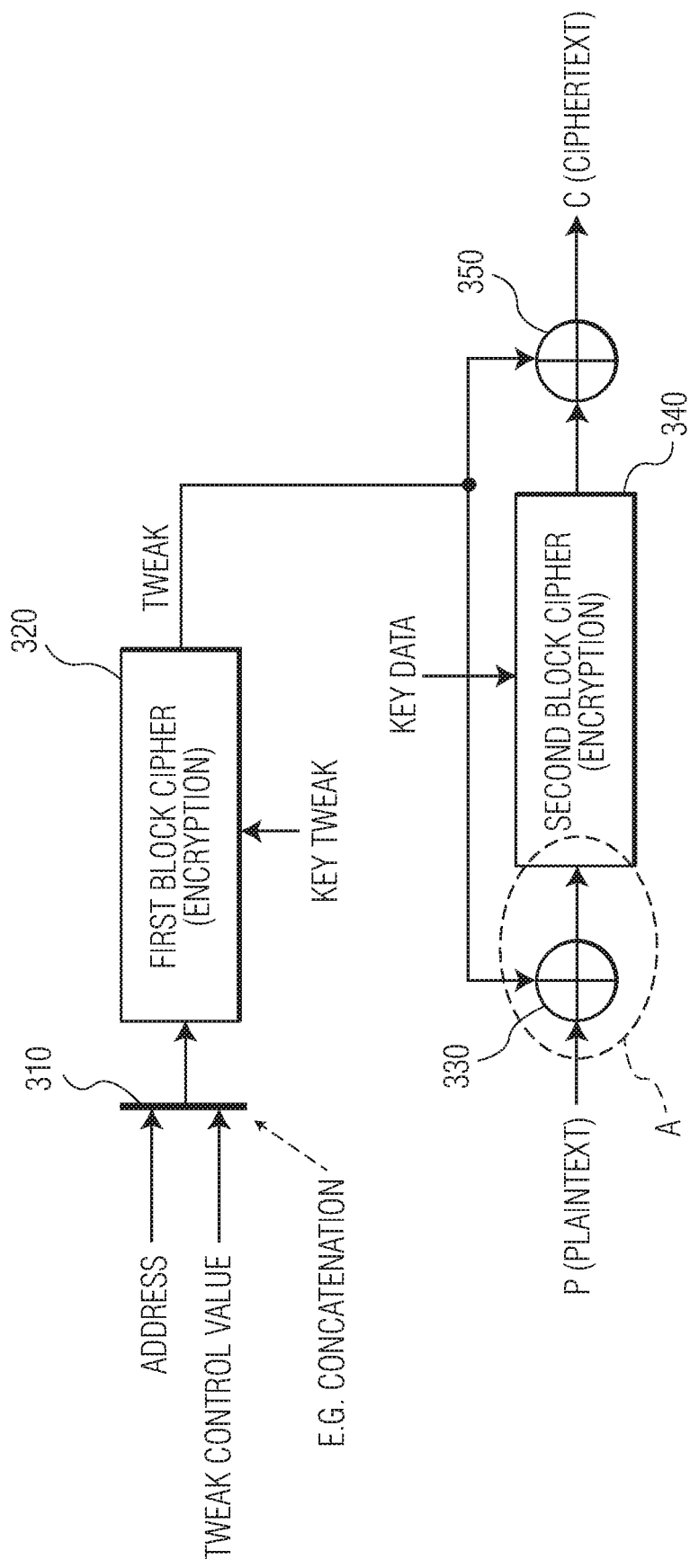
FIG. 3 illustrates an example implementation of the encryption logic of FIG. 2.

FIG. 3 illustrates an example implementation of the encryption logic of FIG. 2. In this embodiment, the combiner 310 performs a concatenation operation on the tweak control value and the memory address where the data is to be written. The tweak control value may be the current value of a counter used to generate count values that are different for the data to be stored at each memory address. In one embodiment, one count value may be shared for a plurality of memory addresses, which, for example, may correspond to a memory region. Even when a write operation is to be performed at the same memory address, using the same or different data, the combined value output from the combiner 210 (and thus the stimulus generated as a result of storing the encrypted data at the memory address) will be different as a result of the use of a different (incremented) tweak control value. In one embodiment, the tweak control value may be changed on every write operation in order to produce a different result.

The first block cipher engine 320 encrypts the concatenated value generated by the combiner 310 using a first key, which in this case is labeled $KEY_{Tweak}$. The resulting tweak is logically combined with the data to be stored in the first logical combination 330, which in this case performs an XOR operation. In this example, the XOR operation is performed on plaintext corresponding to the data to be stored and the tweak generated by the first block cipher engine. The second block cipher engine 340 encrypts the result of the XOR operation based on a second key, which in this example is labeled $KEY_{Data}$ to signify that this key is used to encrypt the plaintext. The encrypted plaintext output from the second block cipher engine is logically combined with the tweak in a second logical combination 350. The second logical combination may perform an XOR operation based on the tweak and encrypted data. The result is then stored in the memory address initially input into the combiner 310. While XOR operations are used to perform the first and second logical combinations in this embodiment, different logic may be used (e.g., based on one or more different logic gates or different combinatorial logic circuits) in other embodiments.

Figure 4:
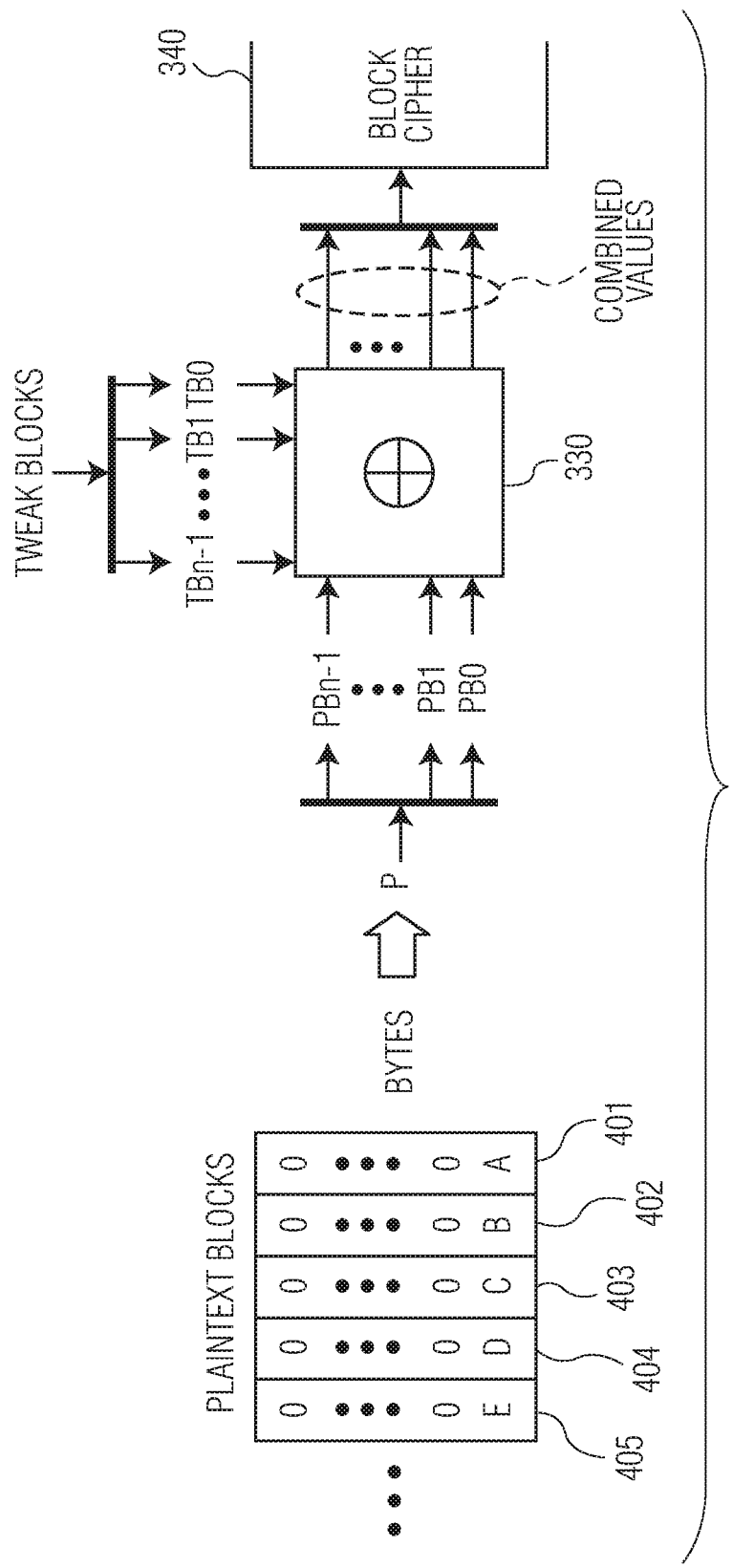
FIG. 4 illustrates an example of a first logical combination operation.

FIG. 4 illustrates an example of the XOR operation performed by the first logical combination 330. In this example, a plurality of plaintext blocks 401 to 405 are successively input into the first logical combination 330. These blocks may correspond to different addresses in memory or to the same address. When the blocks correspond to different addresses in memory, the tweaks may be different because the addresses are different, independently of whether the same or a different tweak control value is used. When the blocks correspond to the same address, the tweaks may not change due to the same address. In this case, templates attacks may be a problem. In order to avoid this problem, the weak control values may be changed.

In one embodiment, the tweak control values may be changed on every write to the address, e.g. each of the blocks 401 to 405 may be assigned a different and/or new tweak control value.

In one embodiment, the same tweak control value may be used for multiple addresses (e.g., the same memory region). In this case, the tweak control value may be changed on demand or based on a control signal generated based on control software. For example, data stored at address A and at address B may be encrypted using a "shared" tweak control value. The tweak control value may be changed after some number of write operations (e.g., 10) to address A or B. Power profiles of these write operations will be insufficient to allow an attacker to build a template. In one embodiment, the number of writes operations required for an attacker to build a template based on the resulting power profiles may be one criterion used to determine when the tweak control value is to be changed.

Each plaintext block includes n bytes of data $PB_{n-1}$ to $PB_0$. All of the bytes of data in each plaintext block have the same values (e.g., bit value of 0) except for one of the bytes, which in this case is illustratively shown to be the last byte but may be a different byte in another embodiment. The different byte includes in the first plaintext block 401 has a value of A. The different bytes in the second plaintext block 402 to the fifth plaintext block have respective values of B, C, D, and E. In this example, the tweak has an equal number of bytes (n) as each plaintext block, with the bytes in the plaintext block are labelled $TB_{n-1}$ to $TB_0$, where TB stands for tweak block.

The XOR operation logically combines the bits of respective bytes of each plaintext block with corresponding tweak blocks output from the first block cipher engine. The results of the XOR operation performed on the plaintext blocks and tweaks generated in FIG. 4 are set forth in Table 1 and in Table 2.

In Table 1, the same tweak control value TCV=T is generated (or used) for the plaintext blocks to be written to a same memory address location. Due to use of the same TCV value and memory address the same tweak block is XOR-ed with the plaintext blocks: 0 ... 0A, 0 ... 0B, 0 ... 0C, 0 ... 0D and 0 ... 0E. The results of these XOR operations are $TB(T)_{n-1}, \ldots TB(T)_0$^A to $TB(T)_{n-1} \ldots TB(T)_0$^E, respectively. These results may have been used by an attacker to create templates.

TABLE 1

| Tweak Control Value | Tweak Block | Plaintext Block | XOR Result |
|---|---|---|---|
| T | $TB(T)_{n-1} \ldots TB(T)_0$ | 0 ... 0A | $TB(T)_{n-1} \ldots TB(T)_1 \, TB(T)_0$^A |
| T | $TB(T)_{n-1} \ldots TB(T)_0$ | 0 ... 0B | $TB(T)_{n-1} \ldots TB(T)_1 \, TB(T)_0$^B |
| T | $TB(T)_{n-1} \ldots TB(T)_0$ | 0 ... 0C | $TB(T)_{n-1} \ldots TB(T)_1 \, TB(T)_0$^C |
| T | $TB(T)_{n-1} \ldots TB(T)_0$ | 0 ... 0D | $TB(T)_{n-1} \ldots TB(T)_1 \, TB(T)_0$^D |
| T | $TB(T)_{n-1} \ldots TB(T)_0$ | 0 ... 0E | $TB(T)_{n-1} \ldots TB(T)_1 \, TB(T)_0$^E |

In Table 2, different tweak control values are generated (or used) for the same plaintext blocks to be written to same memory address location as in Table 1. These TCV values are R, E, W and Q. The corresponding tweak blocks are $TB(R)_{n-1}, \ldots TB(R)_0$, $TB(E)_{n-1}, \ldots TB(E)_0$, $TB(W)_{n-1} \ldots TB(W)_0$ and $TB(Q)_{n-1}, \ldots TB(Q)_0$, respectively. TCV=R is used for the plaintext block 0 ... 0A. The TCV is then changed to E and used for the plaintext block 0 ... 0B. TCV is changed next time to W and used for two plaintext blocks 0 ... 0C and 0 ... 0D. After that, the TCV is changed to Q and used for the plaintext block 0 ... 0E. The results of XOR operations on the corresponding tweak blocks and plaintext blocks are $TB(R)_{n-1}, \ldots TB(R)_0$^A, $TB(E)_{n-1}, \ldots TB(E)_0$^B, $TB(W)_{n-1}, \ldots TB(W)_0$^C, $TB(W)_{n-1}, \ldots TB(W)_0$^D and $TB(Q)_{n-1}, \ldots TB(Q)_0$^E, respectively. These results may occur when a template attack is applied.

TABLE 2

| Tweak Control Value | Tweak Block | Plaintext Block | XOR Result |
|---|---|---|---|
| R | $TB(R)_{n-1} \ldots TB(R)_0$ | $0 \ldots 0A$ | $TB(R)_{n-1} \ldots TB(R)_1\, TB(R)_0\,\hat{}\,A$ |
| E | $TB(E)_{n-1} \ldots TB(E)_0$ | $0 \ldots 0B$ | $TB(E)_{n-1} \ldots TB(E)_1\, TB(E)_0\,\hat{}\,B$ |
| W | $TB(W)_{n-1} \ldots TB(W)_0$ | $0 \ldots 0C$ | $TB(W)_{n-1} \ldots TB(W)_1\, TB(W)_0\,\hat{}\,C$ |
| W | $TB(W)_{n-1} \ldots TB(W)_0$ | $0 \ldots 0D$ | $TB(W)_{n-1} \ldots TB(W)_1\, TB(W)_0\,\hat{}\,D$ |
| Q | $TB(Q)_{n-1} \ldots TB(Q)_0$ | $0 \ldots 0E$ | $TB(Q)_{n-1} \ldots TB(Q)_1\, TB(Q)_0\,\hat{}\,E$ |

The XOR result for the plaintext block in Table 1 is different from XOR result for the same plaintext block in Table 2, since different TCV values are used for them. Different XOR results for the same plaintext block makes template attacks impossible.

The TCV may change for each new plaintext block written to the memory address as it is for the plaintext blocks $0 \ldots 0A, 0 \ldots 0B$ and $0 \ldots 0C$ in Table 2 (e.g., when the TCV is changed on each write operation, each of these plaintext blocks have different TCV values).

In one embodiment, the TCV may change on demand. In Table 2, the same TCV=W is used for two plaintext blocks $0 \ldots 0C$ and $0 \ldots 0D$ and after that is changed to Q which is used for next plaintext block $0 \ldots 0E$ (e.g., when the TCV is changed on demand, e.g. after some number of writes).

In one embodiment, every time TCV is changed its new value must be a one not used before.

Figure 5A:
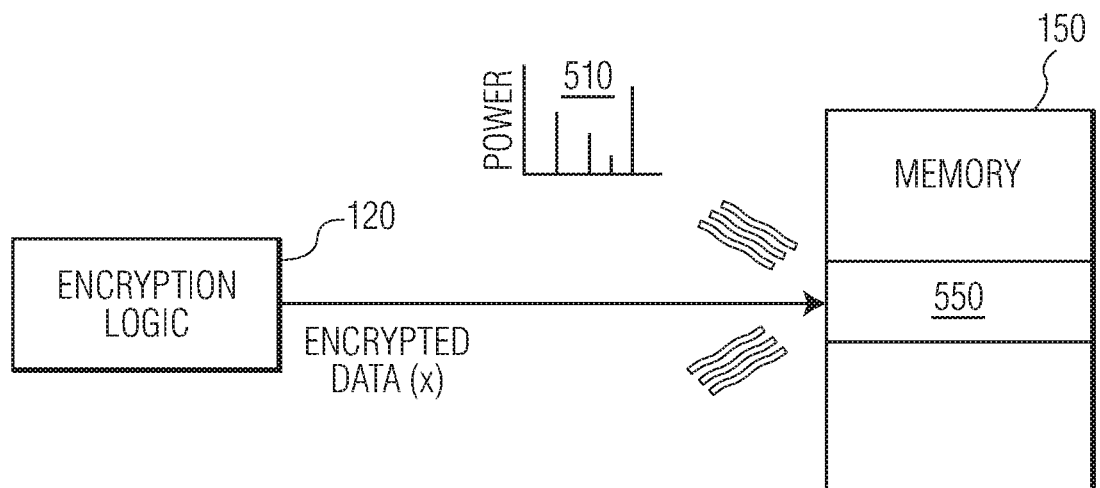
FIGS. 5A and 5B illustrate examples where the same data is written to the same memory address at different times based on different tweak control values.
Figure 5B:
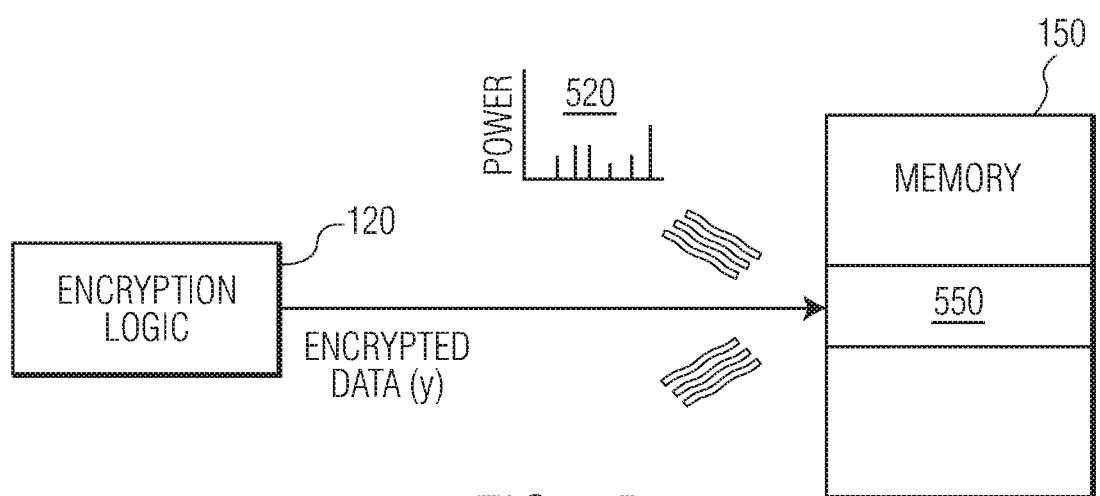

FIGS. 5A and 5B illustrate examples where the same data is written to the same memory address at different times based on different tweak control values. As illustrated in FIG. 5A, data encrypted with a tweak generated based on a first tweak control value (x) generates a first type of stimulus when stored in memory address 550. In this case, the stimulus includes a power consumption spectrum 510 generated at the time the encrypted data is written to the memory address 550.

As illustrated in FIG. 5B, the same data encrypted with a tweak generated based on a second tweak control value (y) generates a second type of stimulus when stored at the same memory address 550. In this case, the stimulus includes a power consumption spectrum 520 generated at the time the encrypted data is stored in this memory address 550. In another embodiment, the stimulus may be different from a power consumption spectrum, e.g., may be any of the types of stimulus described herein or a different type of stimulus.

Based on a comparison of FIGS. 5A and 5B, it is evident that the second stimulus is different from the first stimulus, even though the same data is written to the same memory address and even though the encryption is performed based on the same address. The different stimuli are produced as a result of using different tweak control values for the encrypted data. Thus, by changing the tweak control value for each write operation, the stimulus created when writing encrypted data to the memory will be different, even when the same data is written to the same memory address at different times. Changing the tweak control values, therefore, allows the stimulus created when performing writing operations to be independent from both the address and the data to be written. As a result, even if a malicious entity were able to capture and analyze the stimuli generated when performing write operations to the memory, the different stimuli generated by using different tweak control values prevent the malicious entity from acquiring information that can be used to perform a successful template attack. (Of course, writing different data to the same memory address or writing the same or different data to different memory addresses will also produce different stimuli as a result of using different tweak control values for each write operation.)

Figure 6:
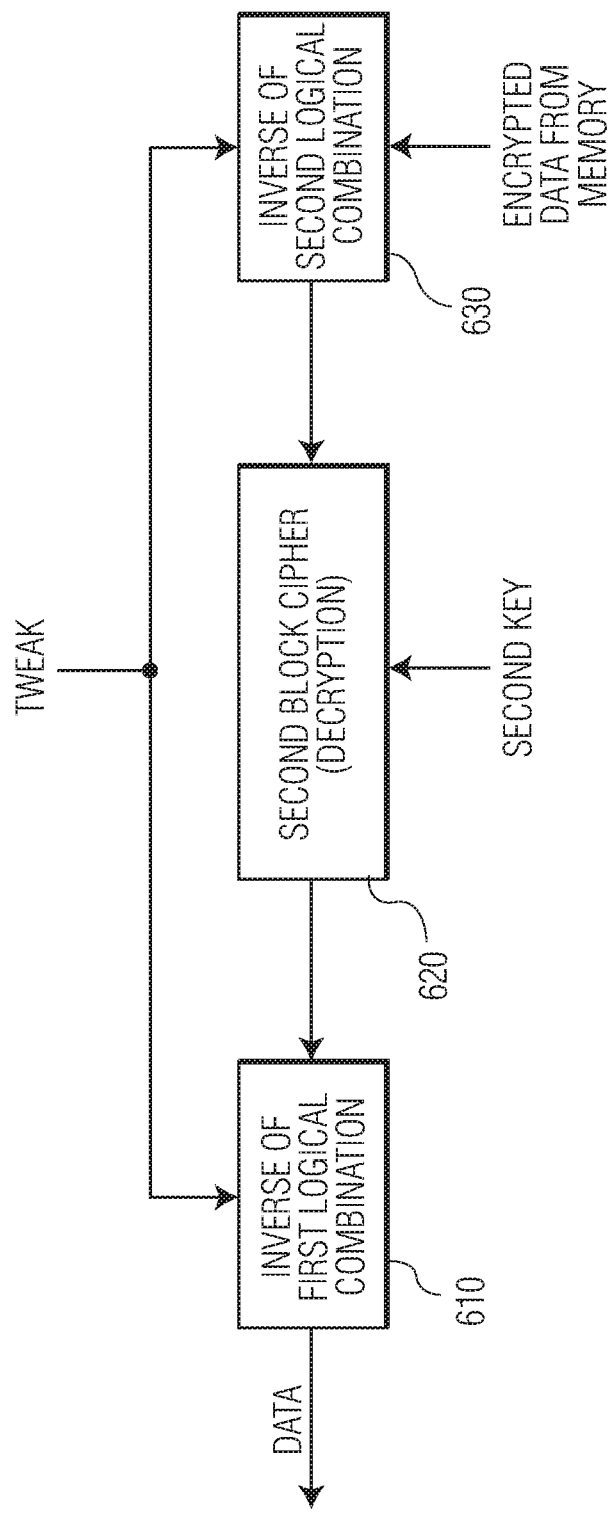
FIG. 6 illustrates an embodiment of a system for recovering encrypted data.

FIG. 6 illustrates an embodiment of a system for recovering encrypted data that has been stored in memory based on a tweak. The system includes a second logical combination block 610, a second block cipher engine 620, and the first logical combination block 630. The second logical combination block 610 receives the encrypted data from the memory in response to a memory read operation. The second logical combination block 610 performs the inverse of the second logical combination (e.g., 250 in FIG. 2) using the same tweak that was used during encryption. For example, if an XOR operation was used to perform the second logical combination during the encryption process, an XOR operation is used by the second logical combination block 610 during the decryption process. The tweak may be obtained from a memory that stored the tweak generated during encryption. In one embodiment, the tweak may be generated from the address.

The second block cipher engine 620 decrypts the output of the second logical combination block 610 based on the same (second) key used by the second cipher block engine 220 in FIG. 2.

The first logical combination block 630 performs the inverse of the first logical combination (e.g., 230 in FIG. 2) using the aforementioned tweak. The result produced from the first logical combination block corresponds to the recovered data.

Like a memory write operation, a memory read operation may generate a stimulus, for example, the types previously described. A malicious attacker may attempt to capture this stimulus and generate information for performing a template attack. However, even if such stimuli are obtained for memory read operations, the use of a different tweak (and tweak control value) used during the encryption process will likewise prevent a successful template from being formed for performing such an attack.

Figure 7:
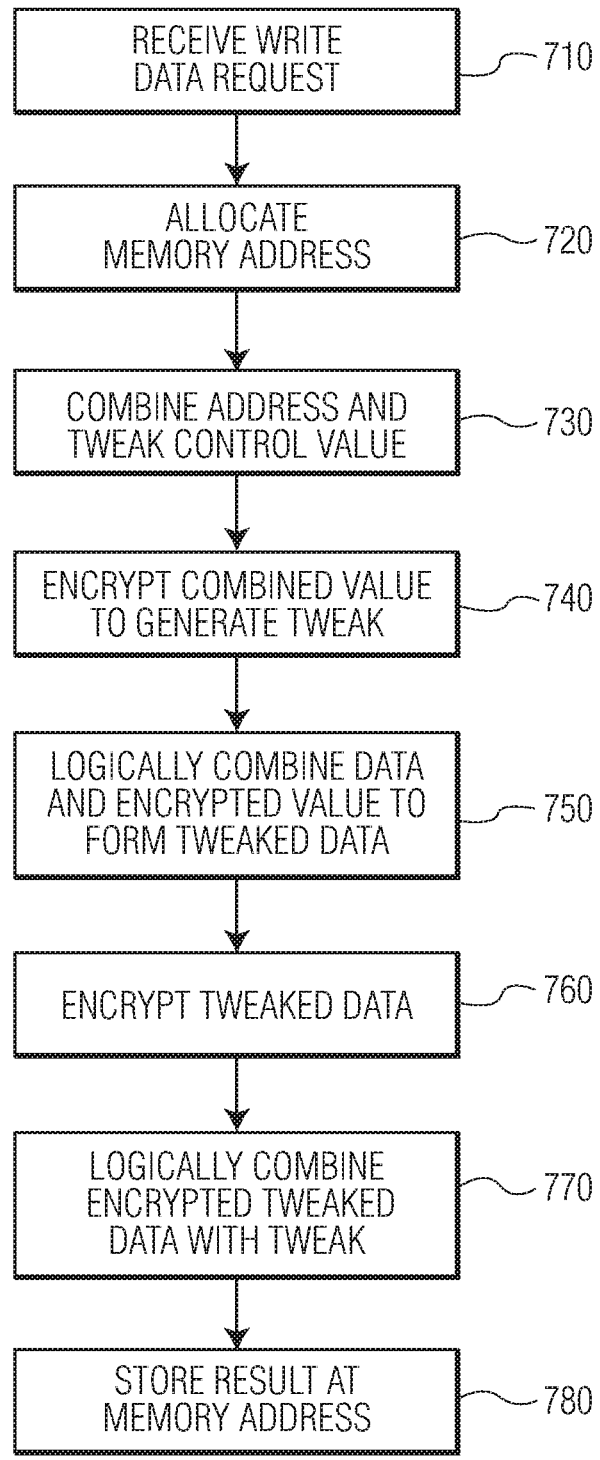
FIG. 7 illustrates an embodiment of a method for protecting encrypted data.

FIG. 7 illustrates an embodiment of a method for protecting encrypted data which is stored in a memory from unauthorized access, corruption, or other forms of malicious attack. The method may be performed, for example, using any of the system embodiments described herein or using a different system.

Referring to FIG. 7, at 710, the method includes receiving a request to write data in a memory. The request may be received from a host device which includes the memory or a device or system coupled to the memory. In this latter case, the device may communicate with the memory over a wired or wireless communication link or one or more networks, such as a mobile communications network or a data network such as the internet, virtual private network, cloud-based network, or another type of network.

At 720, an address for writing data corresponding to the request is allocated by a read/write controller. The read/write controller may be included, for example, in a data storage manager which manages read and write operations performed for the memory.

At 730, the address and a tweak control value are combined, for example, in any of the ways described herein. In one embodiment, the tweak control value may be concatenated to the memory address. In another embodiment, the tweak control value and the address may be logically combined, In yet another embodiment, a different way of combining the tweak control value and the address may be implemented. The tweak control value may be generated by a corresponding generator and may be different for each memory operation. This may be accomplished, for example, by generating the tweak control values as counter values that are incremented for respective ones of the memory write operations to be performed. Incrementing of the tweak control value may be performed, even when data is to be stored at the same memory address and even when the same data is to be stored at the same memory address at different times.

At 740, the combined value generated in operation 730 is encrypted by a first block cipher engine based on one or more first encryption keys. The type of encryption may be any of the examples discussed herein or may be a different type of encryption. The resulting encrypted information is output from the first block cipher engine as a tweak. Because different tweak control values are used and combined with the address corresponding to each memory write operation, a different tweak (or tweak block values) may be generated for each block of data to be stored in the address used for each memory write operation.

At 750, the data (e.g., plaintext) to be written to the designated memory address is combined with the tweak. The data to be written may be in the form of plaintext or another type of data. The combination may include a first logical combination of the address and tweak. The first logical combination may be performed by a combinatorial logic circuit that implements an XOR operation. A different type of combinatorial logic circuit implementing a different type of logical operation may be performed in another embodiment.

At 760, the tweaked data generated in operation 750 is encrypted by a second block cipher engine based on one or more second keys. The type of encryption performed by the second block cipher engine may be the same or different from the type of encryption performed by the first block cipher engine. Also, the one or more second keys may be the same or different from the one or more first keys used to perform the encryption by the first block cipher engine.

At 770, the encrypted data generated by the second block cipher engine is combined with the tweak. The combination may be a second logical combination that is the same or different from the first logical combination. For example, the second logical combination may be performed by a combinatorial logic circuit that performs an XOR operation. In another embodiment, the combinatorial logic used for the second logical combination may be different from the combinatorial logic used for the first logical combination.

At 780, the resulting encrypted data (e.g., ciphertext) is stored in the memory address allocated by the read/write controller. When the encrypted data is stored, a stimulus may be generated from the memory. (In some cases, any of the operations 750-780 may be used as a basis to build a template for attack). The stimulus may be in any of the forms described herein or a different form. A malicious attacker may attempt to capture this stimulus for the purpose of gaining information for performing a side-channel attack (e.g., template attack) on the memory. However, because different tweak control values are used for each memory write operation, it will be very difficult or impossible to determine access to the data or the contents of the memory based on the different stimuli produced from the different tweak control values.

In one embodiment, a data storage manager may correspond to the previously described embodiments, except the address is combined (e.g., logically combined, concatenated, etc.) with the tweak control value and then the combined value—tweak is encrypted. The tweak can then be used in the first logical combination 230.

In another embodiment, the address and tweak control value may be encrypted separately using separate block ciphers with the same or separate keys. All of this information may then be combined together, e.g., encrypted address (tweak), encrypted tweak control value (TCVenc) and plain data in the first logical combination 230. In one embodiment, encryption of the TCV may be omitted and a value from a (pseudo) random generator may be used instead.

In accordance with one or more of the aforementioned embodiments, template and other side-channel attacks may be prevented by appending an additional value to the address used for a memory read operation. The additional value may be referred to as a tweak control value, which may be used as a basis for computing a tweak. The tweak may be combined with the data to form a combined value that is encrypted. The encrypted information is then once again combined with the tweak, and the result is provided for storage at the memory location.

The tweak may be changed to implement a different tweak, even when the same address is issued. In one embodiment, the combinations may be logical combinations based on, for example, XOR operations. This may remove any correlation between power consumption (or other stimuli generated during the memory read operation) and the actual data being stored. The tweak control value may be secret or public.

The controllers, generators, logic, managers, block ciphers, logical combinations, combiners, concatenators, and other information-generating and information-processing features of the embodiments disclosed herein may be implemented in logic which, for example, may include hardware, software, or both. When implemented at least partially in hardware, the controllers, generators, logic, managers, block ciphers, logical combinations, combiners, concatenators, and other information-generating and information-processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, generators, logic, managers, block ciphers, logical combinations, combiners, concatenators, and other information-generating and information-processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Although the various exemplary embodiments have been described in detail with particular reference to certain exemplary aspects thereof, it should be understood that the invention is capable of other example embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

We claim:

1. A method for protecting data comprising:
   encrypting information to generate a first tweak, wherein the information includes a first tweak control value that changes between a first write operation and a second write operation and wherein the first and second tweak control values are generated based upon one of a hash value and selecting a tweak value stored in a lookup table;
   combining a data block with the first tweak to produce a tweaked data block;
   encrypting the tweaked data block to form encrypted data;
   combining the encrypted data with the first tweak to produce combined encrypted data; and
   providing the combined encrypted data for storage in a memory address, wherein storing the combined encrypted data at the memory address generates a first stimulus different from a second stimulus generated by storing identical encrypted data combined with a second tweak at the memory address, the first stimulus is generated based on the first tweak, the second stimulus is generated based on the second tweak, and the first stimulus and the second stimulus correspond to different power consumption spectra.

2. The method of claim 1, wherein the information further includes the memory address.

3. The method of claim 2, further comprising:
   combining the memory address and the first tweak control value to generate a combined value, wherein encrypting the information includes encrypting the combined value based on at least one key to generate the first tweak.

4. The method of claim 3, wherein combining the memory address and the first tweak control value includes concatenating the memory address and the first tweak control value.

5. The method of claim 1, wherein:
   combining the data block with the first tweak is performed based on first logic; and
   combining the encrypted data with the first tweak is performed based on second logic.

6. The method of claim 5, wherein the first logic is same as the second logic.

7. The method of claim 6, wherein each of the first logic and the second logic performs an XOR operation.

8. The method of claim 1, wherein:
   the first tweak is based on a first tweak control value,
   the second tweak is based on a second tweak control value, and
   the first and second tweak control values include at least one of different counter values, random values, or hashed values.

9. The method of claim 1, wherein each of the first stimulus and the second stimulus includes at least one of timing data, power consumption pattern, electromagnetic leak, signal pattern, signature, or waveform.

10. A method for protecting data comprising:
    performing a first process including encryption of a first data block based upon a first tweak control value;
    providing the encrypted first data block for storage at a memory address;
    performing a second process including encryption of a second data block based upon a second tweak control value different from the first tweak control value and wherein the first and second tweak control values are generated based upon one of a hash value and selecting a tweak value stored in a lookup table; and
    providing the encrypted second data block for storage at the memory address, wherein the first process is based on a first tweak, the second process is based on a second tweak different from the first tweak and producing differing stimuli that correspond to different power consumption spectra, the encrypted first data block and the encrypted second data block are provided for storage at the memory address at different times, and the first data block and the second data block have identical data.

11. The method of claim 10, wherein performing the first process includes:
    (a) combining the first data block with the first tweak to form a first combined data block;
    (b) encrypting the first combined block to generate encrypted data;
    (c) combining the encrypted data in (b) with the first tweak to generate the first encrypted data block, for storage at the memory address.

12. The method of claim 11, wherein performing second first process includes:
    (d) combining the second data block with the second tweak to form a second combined data block;
    (e) encrypting the second combined data block to generate encrypted data;
    (f) combining the encrypted data in (e) with the second tweak to generate the second encrypted data block for storage at the memory address.

13. The method of claim 12, wherein the combining in (a), (c), (d), and (f) are performed based on same logic.

14. The method of claim 10, wherein:
    the first tweak is based on the memory address and the first tweak control value; and
    the second tweak is based on the memory address and the second tweak control value.

15. The method of claim 14, further comprising:
    generating the first tweak by combining the memory address and the first tweak control value to form a first combined value and encrypting the first combined value; and
    generating the second tweak by combining the memory address and the second tweak control value to form a second combined value and encrypting the second combined value.

16. A data storage manager comprising:
- a first cipher circuit configured to encrypt information to generate a first tweak, wherein the information includes a first tweak control value that changes between a first write operation and a second write operation and wherein the first tweak control value and a second tweak control value are generated based upon one of a hash value and a selecting a tweak value stored in lookup table;
- a first combiner circuit configured to combine a data block with the first tweak to produce a tweaked data block;
- a second cipher circuit configured to encrypt the tweaked data block to form encrypted data; and
- a second combiner circuit configured to combine the encrypted data with the first tweak to form combined encrypted data for storage in a memory address, wherein storing the combined encrypted data at the memory address is configured to generate a first stimulus different from a second stimulus generated by storing identical encrypted data combined with a second tweak at the memory address, the first stimulus is generated based on the first tweak, the second stimulus is generated based on the second tweak and the first stimulus and the second stimulus correspond to different power consumption spectra.

17. The data storage manager of claim 16, wherein the information further includes the memory address.

18. The data storage manager of claim 17, further comprising:
- a third combiner circuit configured to combine the memory address and the first tweak control value to generate a combined value, wherein the first cipher circuit is to encrypt the combined value based on at least one key to generate the first tweak.

19. The data storage manager of claim 16, wherein:
the first combiner circuit includes first logic to combine the data block with the first tweak; and
the second combiner circuit includes second logic to combine the encrypted data with the first tweak.

20. The data storage manager of claim 16, wherein:
the first tweak is based on a first tweak control value,
the second tweak is based on a second tweak control value, and
the first and second tweak control values include hashed values.

* * * * *